US 6,571,066 B1

(12) United States Patent
Tsai

(10) Patent No.: US 6,571,066 B1
(45) Date of Patent: May 27, 2003

(54) CAMERA WITH MULTIMODE POWER BUTTON

(75) Inventor: Wen-Yi Tsai, Tai-Chung Hsien (TW)

(73) Assignee: Primax Electronics Ltd., Taipei (TW)

( * ) Notice: Subject to any disclaimer, the term of this patent is extended or adjusted under 35 U.S.C. 154(b) by 0 days.

(21) Appl. No.: 10/065,781

(22) Filed: Nov. 18, 2002

(51) Int. Cl.$^7$ .............................. G03B 7/26; G03B 17/00
(52) U.S. Cl. ....................................... 396/299; 396/300
(58) Field of Search .............................. 396/297, 299, 396/300, 301

(56) References Cited

U.S. PATENT DOCUMENTS 4,206,990 A * 6/1980 Imura et al. ............ 396/300 X
5,519,468 A * 5/1996 Ohtake ..................... 396/300

* cited by examiner

Primary Examiner—W. B. Perkey
(74) Attorney, Agent, or Firm—Winston Hsu

(57) ABSTRACT

A camera includes a power supply, a microcontroller having a timer, and a multimode power button capable of being actuated for an actuation time. When the camera is off and the button is actuated, the microcontroller turns the camera on. When the camera is on and the button is actuated so the actuation time is shorter than a threshold time, the microcontroller changes a mode of the camera. And when the camera is on and the button is actuated so the actuation time is not shorter than the threshold time, the microcontroller turns the camera off.

10 Claims, 4 Drawing Sheets

CAMERA WITH MULTIMODE POWER BUTTON

BACKGROUND OF INVENTION

1. Field of the Invention

The present invention relates to a camera, and more specifically to camera control electronics.

2. Description of the Prior Art

Still photo cameras are a popular means of recording events and are used by amateurs and professionals alike. Both film (conventional) cameras and digital cameras are widely used and relatively inexpensive. And while digital cameras have enjoyed a recent surge in popularity, film cameras still hold a majority of market share.

Please refer to FIG. 1 showing a typical camera 10 according to the prior art. The camera 10 is a film camera or a digital camera. The camera 10 comprises a power button 12 for turning the camera 10 on and off, a mode button 14 for changing a mode of the camera 10, and an exposure button 16 for taking a picture. Camera modes affect how the picture is taken and typically include modes such as a normal mode and a low-light mode. The camera 10 further includes other mechanisms (lenses, shutter, film advance, etc) and electronics (control circuit, auto focus, flash, etc) that are well known in the art. When a photographer wishes to take a picture, she must first press the power button 12 to turn the camera 10 on, then press the mode button 14 to put the camera 10 into a desired mode, and finally, aim the camera 10 and snap the photo with the exposure button 16. If one of these steps is skipped, the photo opportunity may be missed or the picture may turn out to be poor.

For user convenience it is sometimes desirable that a camera be small. If portability is a main concern of a camera user, camera manufacturers need to address this by reducing or combining components of the camera. The camera should be easy to handle and compact enough so it can be carried in a shirt pocket for instance. While the prior art camera 10 satisfies this compactness requirement in some respects, the buttons 12, 14, and 16 have some unnecessary redundancy. Thus, space in the camera 10 is wasted and the number of components and cost of the camera 10 are higher than required.

SUMMARY OF INVENTION

It is therefore a primary objective of the claimed invention to provide a camera having a multimode power button that is capable of both turning the camera on and off and switching modes of the camera.

Briefly summarized, the claimed invention includes a camera having a power supply, a microcontroller with a timer, and a button capable of being actuated for an actuation time. When the camera is off and the button is actuated, the microcontroller turns the camera on. When the camera is on and the button is actuated so the actuation time is shorter than a threshold time, the microcontroller changes a mode of the camera. And when the camera is on and the button is actuated so the actuation time is not shorter than (equal to or longer than) the threshold time, the microcontroller turns the camera off.

According to the claimed invention, the threshold time is about 1.5 seconds.

It is an advantage of the claimed invention that the button allows a user to turn the camera off and on as well as to switch modes of the camera thereby reducing components in the camera and saving related costs.

It is a further advantage of the claimed invention that the single button makes the camera easier to use compared to a prior art camera having a multitude of single function buttons.

These and other objectives of the claimed invention will no doubt become obvious to those of ordinary skill in the art after reading the following detailed description of the preferred embodiment that is illustrated in the various figures and drawings.

DETAILED DESCRIPTION

The present invention applies to both film and digital cameras. For clarity of explanation a film camera will be described.

Figure 1:
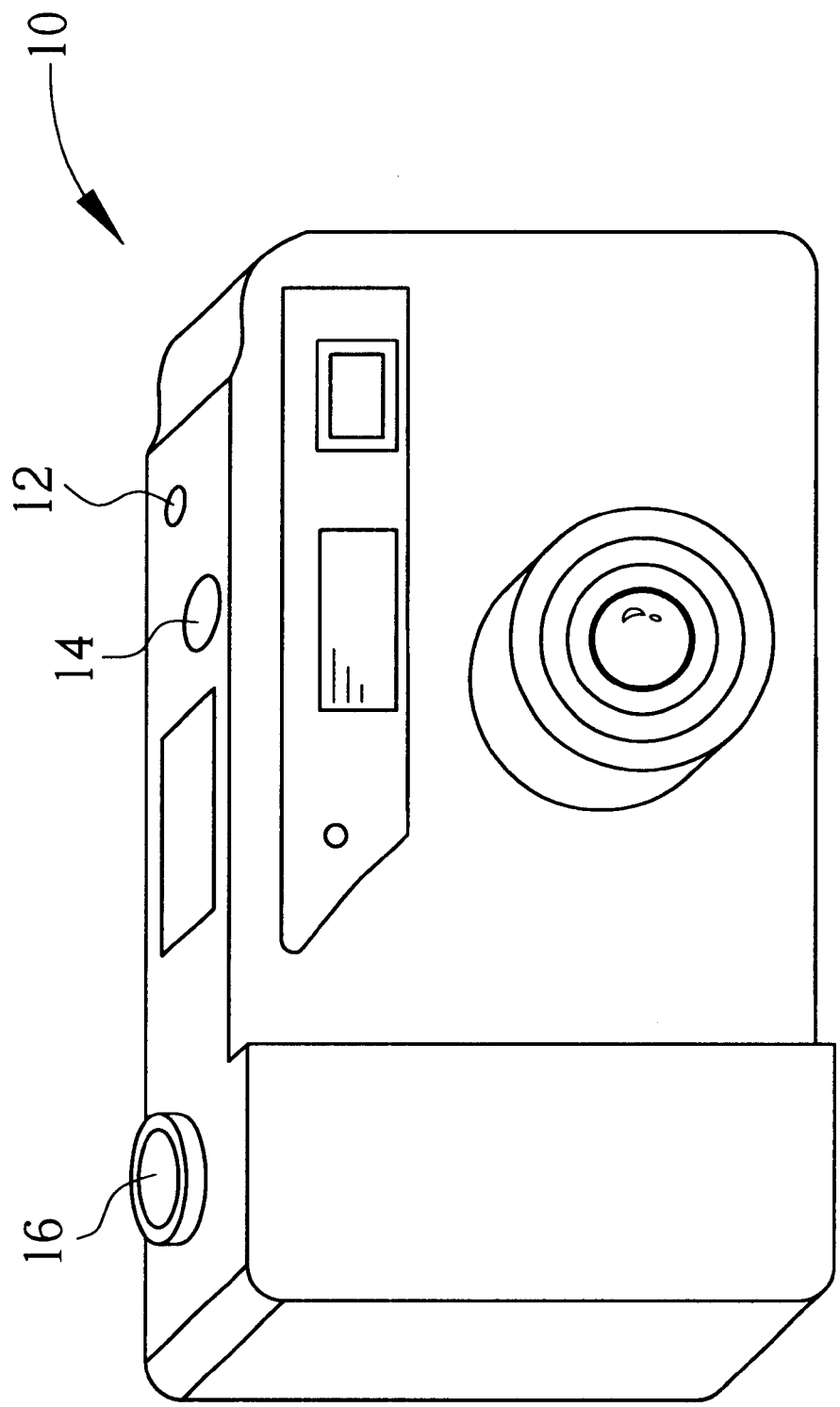
FIG. 1 is a perspective view of a prior art camera.
Figure 2:
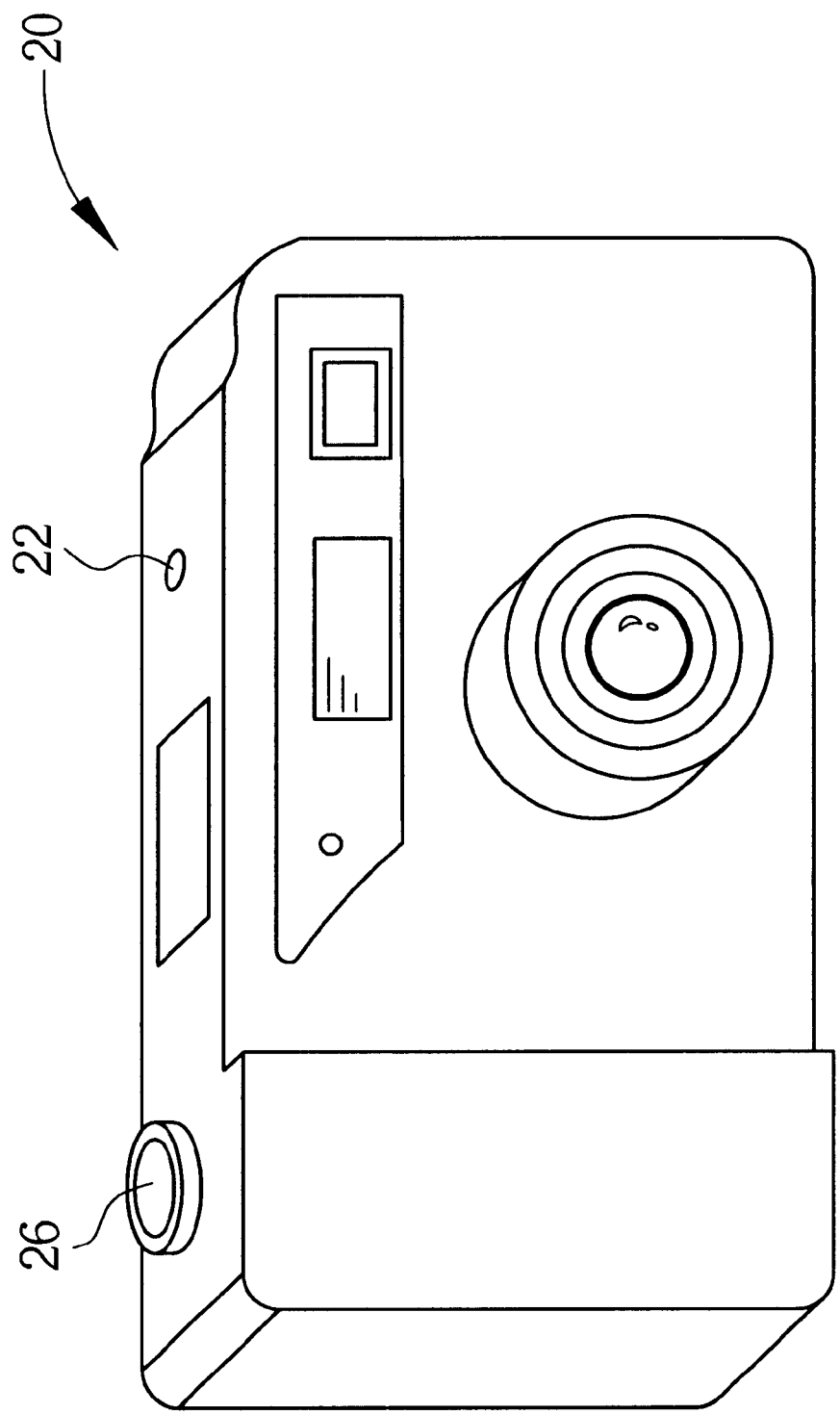
FIG. 2 is a perspective view of a camera according to the present invention.

Please refer to FIG. 2. FIG. 2 shows a camera 20 according to the present invention. The camera 20 comprises a multimode power button 22 and an exposure button 26. The multimode power button 22 can turn the camera 20 off and on and further switch a mode of the camera 20. Modes of the camera 20 include a normal mode, a low-light mode, a delayed exposure mode, and a timed exposure mode. The multimode power button 22 is a pushbutton that can be held down and resiliently springs back to an initial position when released. The exposure button 26 is used to expose film (or a charge coupled device in the case of a digital camera) to take a photograph. The camera 20, like the camera 10, further includes other mechanisms and electronics that are well known in the art for taking photographs.

Figure 3:
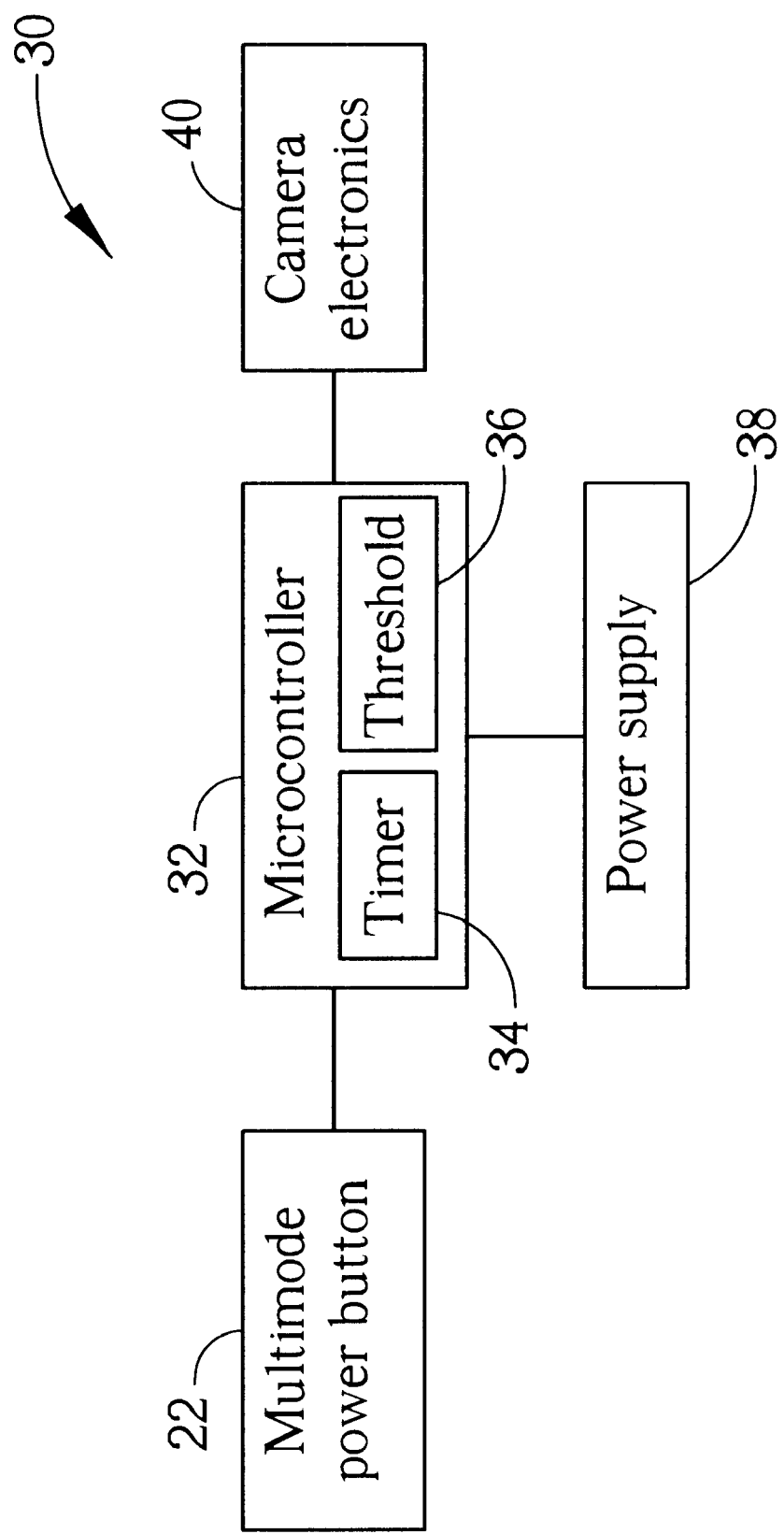
FIG. 3 is a block diagram of a circuit of the camera of FIG. 2.

FIG. 3 shows a present invention circuit 30 that realizes an operation of the multimode power button 22. The circuit 30 includes the multimode power button 22 electrically connected to a microcontroller 32. The microcontroller 32 is an IC chip and has a timer 34 and a stored threshold time 36. The threshold time 36 can be factory set or user adjustable. In the preferred embodiment, the threshold time 36 is factory set at 1.5 seconds. The microcontroller 32 is capable of comparing a time of the timer 34 to threshold time 36 so that 1.5 seconds can be measured. The microcontroller 32 can detect an actuation or depressing of the multimode power button 22 via a button signal, and further measure an actuation time to determine if the button 22 is held down for longer or shorter than the threshold time 36. The circuit 30 further comprises a power supply 38 and camera electronics 40 both electrically connected to the microcontroller 32. In the preferred embodiment, the power supply 38 is a battery. The camera electronics 40 are controlled by the microcontroller 32 and comprise known circuits and devices that control such things as shutter actuation, auto focus, zoom, and flash. Thus, the microcontroller 32 controls the on/off state of the camera 20 as well as the operational mode of the camera 20. Practical concerns such as sound design practices and manufacturing requirements may necessitate additional electrical connections between the components of the circuit 30 other than those described.

Figure 4:
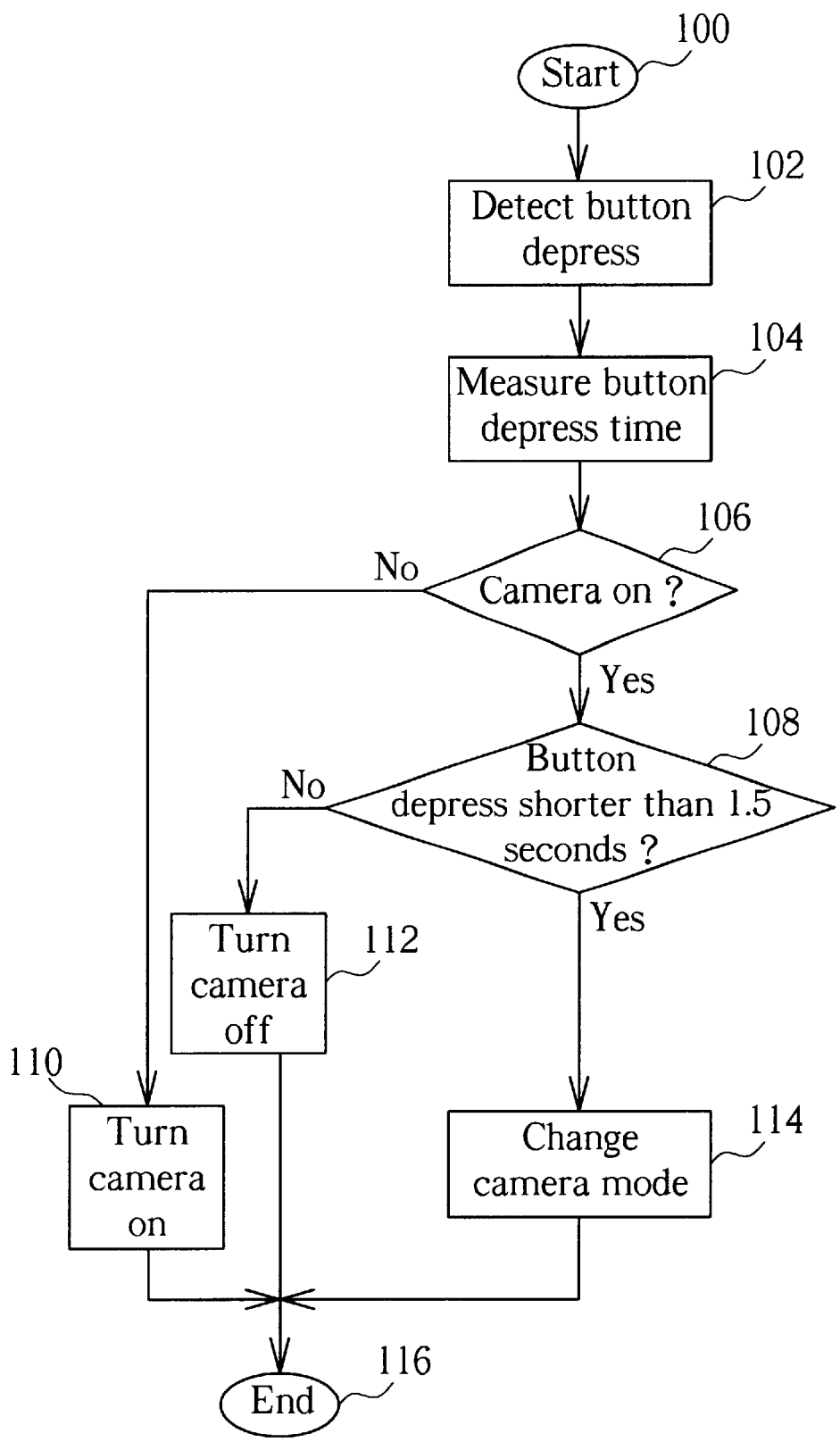
FIG. 4 is a flowchart of an operation of the microcontroller of FIG. 3.

Referring to FIG. 4, the operation of the microcontroller 32 and the corresponding operation of the multimode power button 22 are described as follows:

Step 100:

Start. The camera 20 is either off or on and the microcontroller 32 is periodically detecting for the button signal representing a push of the multimode power button 22;

Step 102:

The microcontroller 32 detects that the multimode power button 22 has been depressed and initiates the timer 34;

Step 104:

Using the timer 34 and the threshold time 36 the microcontroller 32 measures the actuation time of the button 22;

Step 106:

The microcontroller 32 determines if the camera 20 is in the off or on state. Is the camera 20 on? If the camera 20 is on go to step 108, if it is off go to step 110;

Step 108:

The camera 20 is on. Is the button 22 depress time shorter that the threshold time 36 of 1.5 seconds? If it is shorter go to step 114, if it is not shorter go to step 112;

Step 110:

The camera 20 is off. The microcontroller 32 turns the camera 20 on;

Step 112:

The multimode power button 22 has been depressed for a time that is equal to or longer than 1.5 seconds. That is, the button 22 has been held down by a user. The microcontroller turns the camera 20 off;

Step 114:

The multimode power button 22 has been depressed for a time that is shorter than the threshold time 36 of 1.5 seconds. The microcontroller 32 changes the mode of the camera 20;

Step 116:End.

This procedure can be repeated continuously so that the camera 20 can be turned off or on and switched into different modes at any time. Some steps of the procedure are interchangeable, for instance, the step 106 can come before the step 104 if design conditions favor this. The mode change of step 114 of the camera 20 occurs according to a predefined fixed or changing logical sequence that is stored in the microcontroller 32. This sequence can be fixed (such as A-B-C-A . . . where A, B, and C are camera modes) or it can be changing depending on a more complicated logic that considers operating conditions or user preferences (e.g. normally A-B-C-A . . . but B-AC-B . . . when in a low-light environment). In this way the multimode power button 22 in conjunction with the microcontroller 32 can control both the on/off state and the operational modes of the camera 20.

In contrast to the prior art, the present invention multimode power button has functionality previously found in two or more buttons to control both an on/off state and a sequence of operational modes of a film or digital camera. As a result, the present invention saves parts and reduces manufacturing costs, while at the same time providing improved user convenience. Furthermore, the present invention multimode power button enables a more compact camera design that is more readily portable.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A camera having a multimode power button, the camera capable of being on such that the camera is capable of functioning according to a plurality of operational modes to take photographs, the camera capable of being off such that the camera is incapable of functioning in the plurality of operational modes, the camera comprising:

a power supply;

a microcontroller electrically connected to the power supply, the microcontroller having a timer for determining a time; and a button electrically connected to the microcontroller, the button capable of being actuated for an actuation time, the button when actuated sending a button signal to the microcontroller;

wherein when the camera is off and the button is actuated, the microcontroller turns the camera on; when the camera is on and the button is actuated so the actuation time is shorter than a threshold time, the microcontroller changes the mode of the camera; and when the camera is on and the button is actuated so the actuation time is not shorter than the threshold time, the microcontroller turns the camera off.

2. The camera of claim 1 wherein the threshold time is approximately 1.5 seconds.

3. The camera of claim 1 wherein the threshold time is adjustable.

4. The camera of claim 1 wherein the button is a resilient pushbutton that is capable of being held down.

5. The camera of claim 1 wherein the plurality of modes comprises a normal mode, a low-light mode, a delayed exposure mode, and a timed exposure mode.

6. The camera of claim 5 wherein when the microcontroller changes the mode of the camera, the microcontroller selects a mode of the plurality of modes according to a sequence.

7. The camera of claim 6 wherein the sequence is changeable and depends on operating conditions of the camera.

8. The camera of claim 1 wherein the camera is a film camera for taking film-based photographs.

9. The camera of claim 1 wherein the camera is a digital camera for taking digital photographs.

10. The camera of claim 1 wherein the power supply is a battery.

* * * * *